United States Patent Office 3,173,016
Patented Mar. 9, 1965

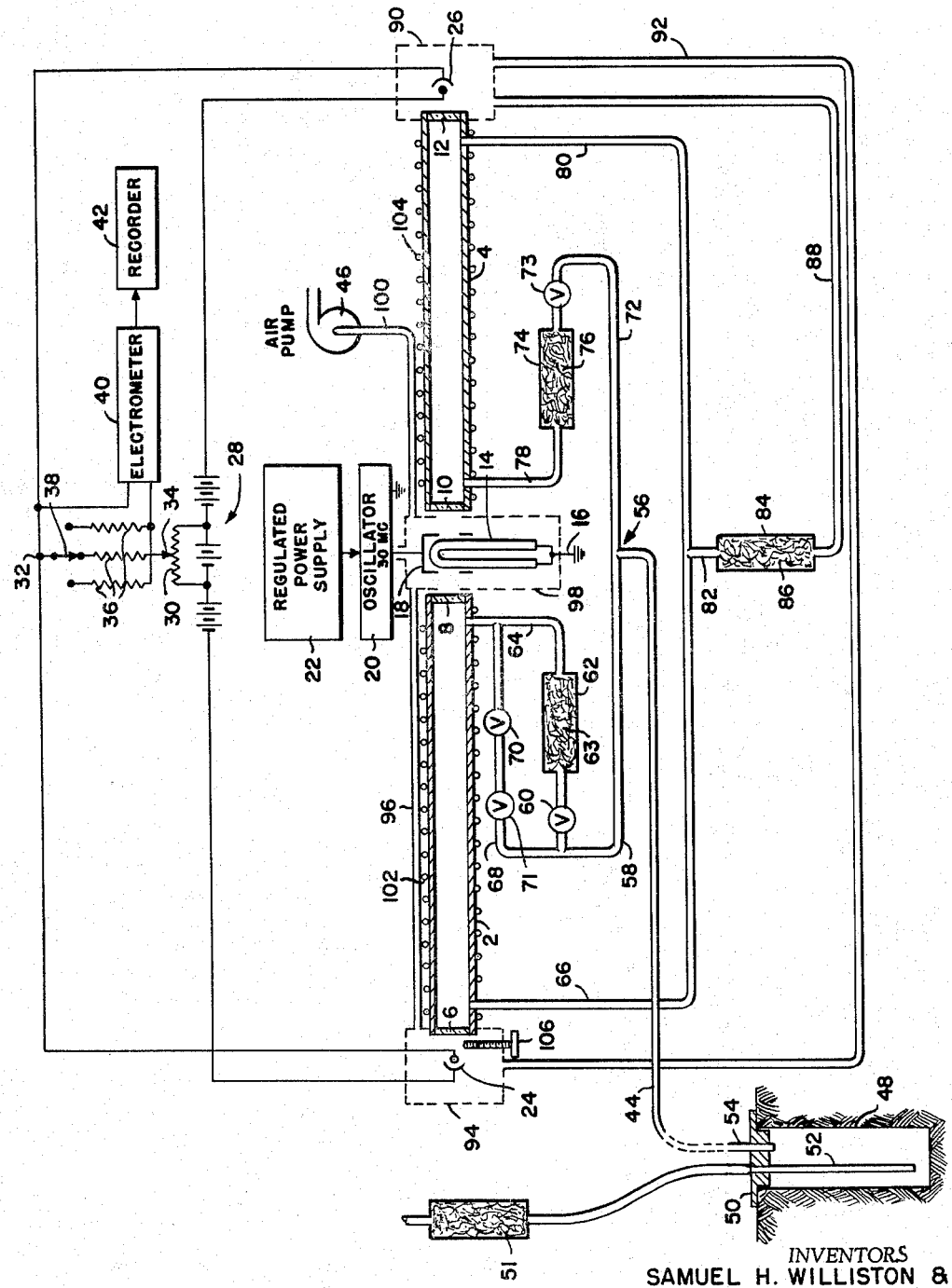

3,173,016
METHOD AND APPARATUS FOR MEASUREMENT OF MERCURY VAPOR
Samuel H. Williston, Los Altos, and Marion H. Morris, Mountain View, Calif., assignors to Cordero Mining Company, Palo Alto, Calif., a corporation of Nevada
Filed Mar. 5, 1962, Ser. No. 177,951
39 Claims. (Cl. 250—218)

This invention relates to a method and apparatus for detection and measurement of mercury vapor in air, and particularly for measurements of extremely low vapor concentration.

The objects of the invention may be best appreciated by consideration of concentrations of mercury vapor which may exist in air. Ordinary air saturated with mercury vapor at ordinary temperatures may contain around $1.5 \times 10^{-2}$ grams of mercury per cubic meter. Heretofore detectors have been provided capable of indicating concentrations of the order of $1 \times 10^{-4}$ grams of mercury per cubic meter. Such detectors have been used primarily for the warning of health hazards which are usually considered to exist if the concentration of mercury rise above about $3 \times 10^{-4}$ grams per cubic meter, and such devices are satisfactory for warning purposes, as of leaks in mercury boilers, chemical laboratories, and the like. In accordance with the present invention measurements of mercury concentration may be made when the air contains less than $4 \times 10^{-9}$ grams per cubic meter, and measurements may be made under conditions of continuous flow of air. As will appear, the apparatus involves the use of a detecting tube in which the amount of mercury present may be less than $4 \times 10^{-12}$ grams. The sensitivity of the apparatus may be realized when it is considered that it will measure the concentration of mercury in air flowing over a silver coin held at ordinary room temperature.

While the apparatus in accordance with the invention may obviously be used for the general detection of minute amounts of mercury vapor in air, its particular utility is in the detection of subterranean mineral deposits containing mercury. It has been found that over mercury ores there will exist concentrations in the air greatly exceeding the concentrations measurable by the apparatus. During a normal California day in the Coast Range, the mercury content of air eight feet above the ground will range from $4 \times 10^{-8}$ to $8 \times 10^{-8}$ or more grams per cubic meter, this being at locations remote from mines and manufacturing plants using mercury. Over mercury ores which could be economically worked this concentration greatly increases.

It may be here remarked that though the workable deposits of mercury throughout the world are usually in the form of cinnabar, this seems always to contain free mercury, often actually visible therein in the case of deposits near the surface. Theory has it that this free mercury results from oxidation of the sulphide and then, or possibly directly, reduction by organic materials, so that the detectability of mercury deposits is not due to direct detection of the relatively nonvolatile sulphide but rather to the accompanying free mercury.

The foregoing is not only true of ores from which mercury may be economically extracted, but it is also true in the regions above other mineral deposits which may contain, in themselves, only very small amounts of mercury, such as deposits of silver, gold and zinc. The apparatus is accordingly designed particularly for the purpose of prospecting to locate potential ores not only of mercury but of these other metals. In accordance with the invention the apparatus may be carried by an airplane flying over regions subject to the search for ores. If mercury is thus detected better and more accurate measurements may be made by the same type of apparatus carried by a truck and used to examine the regions of interest more carefully. In particular, for these purposes, the apparatus is portable and may be of field type.

Its principle, in brief, is that of detection of absorption of ultraviolet radiation by mercury vapor, this being carried out in a highly sensitive and reliable fashion.

One of the objects of the invention has to do with the method of prospecting involving use of the apparatus.

Another object of the invention has to do with the provision of an apparatus which is extremely sensitive and reliable even though portable for field use. Such apparatus may be used not only for prospecting but for detection of mercury vapor in or about laboratories or manufacturing plants with the objective of eliminating health hazards or eliminating mercury contamination of other processes. In this detection the present apparatus is specific to mercury. Other vapors exist which absorb ultraviolet light in the mercury spectrum and will give spurious results in the use of ultraviolet mercury detectors heretofore known; but the present apparatus gets rid of the effects of such other vapors as will more clearly appear hereafter.

The foregoing and other objects of the invention will become apparent from consideration of the following description, read in conjunction with the accompanying drawing, in which the figure is a mechanical-electrical diagram illustrating a preferred embodiment of the invention.

While, as will become obvious, certain aspects of the apparatus may be used for the specific detection of minute amounts of other substances, its primary utility is in the specific detection of mercury vapor, its arrangement being such that mercury vapor alone is detected to the exclusion of other substances which might be present and which would effect absorption in the same bands of the spectrum as mercury.

Referring to the drawing, there are shown at 2 and 4 a pair of tubes which, as will appear later, contain air samples which are to be compared. In brief, one of these, in this case tube 4, will contain flowing air containing the mercury vapor, while the other tube 2, will contain air from the same source but with the mercury vapor removed. These tubes, desirably blackened internally by a baked enamel, are closed at their ends by windows 6, 8, 10 and 12 formed of quartz or ultraviolet-transmitting glass. The tubes have the same length between their windows, and are desirably of substantially identical internal diameters. The windows 8 and 10 may be lenses to concentrate the illumination on the photocells.

Between the adjacent ends of the tubes there is located a mercury vapor light source 14 which emits the characteristic radiation of ionized mercury vapor. It is found that entirely satisfactory is an ordinary low pressure mercury lamp tube such as is commonly used for therapeutic purposes, such a tube being usually of U-shape provided with electrodes at its ends. A low pressure lamp is superior to a high pressure lamp in that the most useful radiation is in the 2537 A. band which is reversible and in a high pressure lamp the mercury vapor about that region which is emitting may provide substantial absorption cutting down the effectiveness of the useful radiation. In a low pressure lamp about 75% of the radiation is in the 2537 A. band, the remainder being in the higher ultraviolet and in the visible bands.

For present purposes, the tube is not desirably energized by current flowing between the electrodes, since it is found that the energization, by low frequency alternating current, causes plasma oscillation and reduces the overall sensitivity of the apparatus. Instead, therefore, the electrodes are joined and grounded as indicated at 16 and excitation is provided at high radio frequency by surrounding the bent end of the tube by an exterior electrode indicated at 18 and provided with openings through which the radiation may pass into the tubes 2 and 4. Excitation is effected by feeding this exterior electrode with high frequency current from an oscillator 20. As indicated in the drawing, the frequency may be crystal-controlled at about 30 megacycles, though this frequency is rather arbitrary and not critical, though desirably constant to produce uniformity of results. By using such high frequency energization substantially continuous ionization is provided, the interval between cycles being so short that deionization does not occur. To secure constant operation the oscillator is energized by a regulated power supply 22. The power supply and oscillator may be of any suitable type such as commonly used for continuous wave radio communication purposes and they need, therefore, not be described in detail.

It may be here remarked that the major radiation of interest obtained in this way is in the 2537 A. band. The radiation in this band is not only produced by a mercury vapor source but is absorbed by mercury vapor, the band being reversible as already noted. While the apparatus might be made more sensitive by utilization of a monochromator system, isolating this band from the spectrum, it has been found unnecessary to involve this elaboration because of the adequate sensitivity nevertheless secured. Consequently the mercury vapor source tube is used without association of spectrometer means or special filters.

Associated with the outer ends of the tubes and adjacent to the windows 6 and 12 for the detection of the transmitted illumination are photocells 24 and 26 of types, such as 935, highly sensitive to the above mentioned band which is utilized. Only ordinary vacuum photocells of this type are required, and do not require the elaborate precautions in use typical of the more sensitive multiplier photocells which are difficult to control as to stability. As shown in the figure, these photocells are connected, in series with a suitable battery, or other regulated supply, indicated at 28, a suitable number of the central cells of this battery being shunted by the resistance 30 of a potentiometer. An output is taken between the adjustment contact 34 of this potentiometer and the symmetrically disposed point 32 of the circuit which is connected to the cathode of photocell 26 and to the anode of photocell 24. For the purpose of varying sensitivity, there will be selected between these bands any one of a group of high resistances 36 by means of a switch 38. These resistances may be typically of the order of 300, 3000 and 14,000 megohms. The output taken between point 32 and contact 34 is delivered to the input of an electrometer 40, the input tube being an electrometer tube having a very high input resistance. The electrometer accordingly acts as a vacuum tube voltmeter. Its output may be read on an ordinary voltmeter, but for prospecting purposes it is usually desirable to have it feed a conventional recorder 42 to give a chart of readings against time.

The adjustable contact 34 of the potentiometer is provided for zero setting purposes, correcting for differences in the photocells. When adjustment of this and other parts of the apparatus are made, a symmetrical system is provided to give a zero input to the meter, substantially independent of such changes in source intensity as may residually occur. Readings of mercury vapor concentration are then represented by deviations from zero.

Air to be sampled is drawn into the apparatus through a tube 44 by an air pump 46. Typically, in operation, a flow of air of around one to three liters per minute has been found desirable.

Before proceeding with further description of the apparatus, a sampling procedure may be referred to. Whereas for preliminary investigation of a region the air may be drawn from an ambient atmosphere directly, in the more careful checking of a region it has been found desirable to provide shallow holes such as indicated at 48, having a depth of approximately a foot, in the dry earth. A cover 50 is provided to close the upper end of the hole and mercury-free air is drawn to the bottom of the hole through a mercury-absorbing chamber 51 and a tube 52 and removed at its upper end through a tube 54 connected to the main inlet tube 44. The tube 51 may contain an absorbing material of the type referred to hereafter. By proceeding in this fashion there is typically secured a ten-fold betterment of concentration of mercury in the air entering the apparatus. In explanation of this, it may be stated that apparently above a deposit containing mercury the earth contains liquid mercury. That this is the case seems to follow from the fact that, as measured in the ambient atmosphere, the mercury concentration varies with diurnel temperature changes, the concentration being relatively low at night when the earth is cool and rising as the earth heats up during the day, the mercury apparently undergoing successively evaporation and absorption or condensation. Rain lowers the concentration of mercury in the atmosphere and a wet surface apparently blocks the evaporation so that measurements are desirably made in dry weather and during the day when the earth is relatively warm. It will be evident that by drawing the mercury vapor from a hole such as 48 an aspect of a higher concentration exists and particularly independence of the effects of wind which may create major disturbances in readings. The absorption tube 51 eliminates the disturbing variations of mercury concentration in the ambient atmosphere.

The tube 44 leads to a T 56 connected at one side to a tube 58 which leads through a valve 60 to a mercury-absorption chamber 62 containing an absorption medium 63, in turn connected to an inlet to the tube 2 through connection 64. The absorption tube 62 may be bypassed, for calibration purposes, by a line 68 containing a shut-off valve 70 and also an adjustable valve 71.

The other side of the T 56 is connected through tube 72 and an adjustable valve 73 to a dummy chamber 74 containing a material 76, the tube 74 being connected to the inlet of the tube 4 through connection 78.

The tubes 2 and 4 are connected to the respective outlet tubes 66 and 80 for withdrawal of the air therein, and these are joined at a T 82 connected to a mercury-absorption tube 84 containing an absorption medium 86. The outlet of the chamber 84 is connected through tube 88 to a series arrangement of housings. The first of these, 90, surrounds the photocell 26. This housing then connects through tube 92 to the housing 94 surrounding the photocell 24, and this is in turn connected through tube 96 to the housing 98 which encloses the lamp 14, and which is in turn exhausted through line 100 leading to the air pump 46. The housings are provided with closed windows to provide for the passage of the illumination through the tubes 2 and 4, though the photocell housings may be closed by direct connection to the tubes and the windows thereof.

To complete the description of the apparatus, the tubes are provided with heating coils 102 and 104 used at intervals for baking them to remove accumulated mercury or other volatile materials.

The mercury-absorption chambers 62 and 84 (and also 51) contain highly effective absorption media 63 and 86 for the removal of mercury from the flowing air.

Useful for this purpose is glass wool having its fibers coated with pure gold. A coating of silver may also be used, but this is not as desirable as gold because of its susceptibility to formation of silver sulfide under the action of hydrogen sulfide content of the air, though it may be used in sulphur-free and chlorine-free atmospheres. Other metals which are characterized by wettability by and some solubility in mercury may be used, but none has been found to be more effective than gold. The gold may be deposited on the glass wool by ordinary and convenient deposition methods, for example by merely being wetted with a gold salt, such as chloride, decomposed for deposition of the gold by heat. There may be used, in place of glass wool, nickel wool on which the gold is deposited in the same fashion or by precipitation by the nickel from a solution of a gold salt. A difficulty with glass wool is that glass will absorb, to some extent, mercury, and consequently, as will be mentioned immediately, the dummy chamber 74 will be required to be saturated to the extent of this absorption before use. In the case of nickel, however, the absorption of mercury is negligible. Other carriers of gold or silver may also be used, such as alumina, completely coated to prevent absorption of water, the general properties of the carrier should be that of a physical form to present a maximum absorbing surface of the noble metal per unit volume, reasonably low resistance to flow, adhesion to its absorbent coating, and nondestructible by heat used to drive off mercury. In itself, it should be non-absorptive of mercury, or at least exhibit uniform absorption thereof. The last property may be best described by saying that the carrier should be non-wettable by mercury. It should, so as to be usable in the dummy chamber, be non-absorptive of other substances which absorb the radiation bands absorbed by mercury. The nozle metal coating on the carrier should be very thin, ranging from a small fraction of a thousandth of an inch to not more than a few thousandths. The reason for the latter limitation is that if a thick coating, of gold for example, is used, the absorbed mercury will diffuse deeply thereinto and will not be driven off completely in regeneration of the absorbent by heat at moderate temperatures.

The reason for the dummy chamber 74 is that there should be interposed between the T 56 and the T 82 two branch passageways for the air which involve substantially the same resistance to air flow during measurement. The reason for this is that the apparatus compares the samples at any instants in the tubes 2 and 4 and it is desirable therefore, that the sample of air which is drawn into the apparatus and which enters the T 56 should appear in both tubes simultaneously and leave simultaneously so that the mercury-containing and the mercury-free air in these tubes should come from the same sample of the source. Accordingly, the dummy chamber 74 contains the same fibrous material 76, glass, nickel, wool, alumina or other carrier uncoated, as is used in the chamber 62, similarly packed. (The gold coating may be extremely thin and is negligible from the standpoint of changing the flow characteristics.) The operating tubing should, of course, involve substantially identical lengths in the tube branches to insure the same symmetry of flow.

Since precise balancing of the apparatus is required, and since the photocells may have slightly different effective sensitive areas, it is desirable to assist balancing by adjustable occultation of at least one of the cells, and this result is achieved by providing adjustable occultating vanes (not shown) for rough balancing together with a screw 106 for fine balancing, the screw being threaded into the housing 94 and having its end movable across the path of illumination to the photocell 24.

While balancing must precede operation, the aspects thereof will be best appreciated following description of the normal measuring operation, and hence reference to the balancing matters will be deferred.

Assuming that the apparatus is balanced electrically, illumination-wise, mechanically and pneumatically, operation is as follows:

Air drawn through the tube 44, either directly from the atmosphere or from a hole in the earth such as 48, passes to the T 56 and is there equally divided from the standpoint of flow so that half of it passes through tube 58 and the other half passes through tube 72. Valve 70 at this time is closed, and valve 60 is open. The air passing through the chamber 62 has substantially all of its mercury content removed by the absorbent 63 and hence the sample passing through the tube 2 will be substantially mercury-free. There may remain minute residual amounts of mercury but these are negligible and, in any event, taken into account in calibration, considering that what is of interest are only amounts of mercury of significance, indicating, for example, the presence of ores giving rise to substantial, though minute, quantities of mercury in the incoming air.

The half of the flow which passes through tube 72 and flows through chamber 74 does not have its mercury removed and hence the sample flowing through tube 4 contains substantially the original mercury content of the air. The result is that there is differential absorption of the caracteristic illumination particularly of the wave length band 2537 A. The amount of this absorption is substantially linearly proportional to the mercury present in the air in tube 4. The effective resistances of the photocells 24 and 26 differ in accordance with this differential absorption of the illumination, and this provides an unbalance of the circuit giving rise to a potential drop between the points 32 and 34 to provide an indication by the electrometer 40 and recording by the recorder 42. The resistance 36 selected into the circuit depends upon the concentration of mercury, the resistances serving to provide adjustment of sensitivity. While the system involves the measurement of a very small difference of response of the two photocells against a background of high illumination, the arrangement is extremely sensitive to this difference, by reason of the differential arrangement and the possibility of accurate balance, so that, as previously noted, it has been found unnecessary to provide filtering or other system for establishing monochromatic illumination.

By reason of the equal resistance to flow of the alternate flow paths, the halves of a given sample entering the T 56 reach the tubes 2 and 4 simultaneously so that there are substantially no transient disturbances as the composition of the flowing air changes, the changes in compositon being indicated smoothly.

Continuing the description of the operation, the air samples leaving the tubes 2 and 4 join at the T 82 and pass through the chamber 84 containing the absorbent 86 which is the same as that in the chamber 62. The purpose of the chamber 82 is to remove the mercury content of that part of the air which passed through the tube 4 so as to give rise in line 88 to substantially mercury-free air. This air passes in series through the chambers 90 and 94 to keep the ambient region free of mercury so that no disturbances result thereat, the measurement being confined, accordingly, to the samples within the lengths of the tubes 2 and 4 which are equal. After passing through the housing 94 the air purges the lamp housing 98. This is important not only to free it of mercury, but primarily to remove ozone which is formed about the lamp 14 and could constitute a disturbing factor in that ozone displays absorption of the ultraviolet radiation from the lamp.

The drawing of samples directly from the atmosphere or from a hole in the earth has been described. The apparatus may also be used, in prospecting, in another fashion particularly where collection of samples by airplanes is involved, in which samples the mercury content may be particularly low. In such case the apparatus may be in a laboratory, and the collected samples may be drawn over an absorbent material such as gold or silver (using an absorbent such as that at 63 already described), the absorbent with collected mercury being then taken to a laboratory wherein the absorbent may be heated to drive off mercury vapor which is entrained in air drawn into the apparatus and subjected to analysis as described above. In this way a high concentration of mercury may be secured for purpose of measurement. This expedient of intervening concentration of mercury may be used in other cases where mercury concentration is very low.

Reference may now be made to matters of adjustment and calibration. These steps may be carried out in various fashions. Initial zero adjustment may be achieved by closing valve 60 and opening fully valve 70 so that air, possibly containing mercury, may pass through both tubes 2 and 4. Zero balancing of the electrical apparatus, by adjustment of potentiometer contact 34 may be first effected. Then the illumination may be reduced by changing the excitation of the lamp 14. When this is done the apparatus should still remain in balance, but in the event that it does not remain balanced the screw 106 and contact 34 may be adjusted, and the tests repeated until the apparatus becomes balanced against changes of illumination. Valves 71 and 73 may be adjusted to throttle the flows for equalizing flow rates during the adjustments.

Following this the valve 70 may be closed and valve 60 opened and the apparatus may be tested for stability and equality of flow changes most conveniently by introduction into tube 44 of mercury-free air into which small amounts of acetone may be introduced. The reason for the use of acetone is that it exhibits absorption in the ultraviolet band of interest around 2537 A. but at the same time is not absorbed by the absorbent 63. If slight differences of flow are observed, detected by transient responses as samples of acetone are introduced, adjustment of valve 60 may be made to produce the same flow through both of the alternate paths of the apparatus. It may be remarked that to make this possible the flow path through the chamber 74 may be made initially slightly more resistant than that through the chamber 62 with the valve 60 open so that this valve, finely adjustable needle valve, can be used for flow balancing.

Finally, the apparatus may be calibrated for content of mercury by injecting into a measured volume of air to be drawn into the apparatus small and measured samples of air of known mercury concentration such as may be obtained from an ambient atmosphere above liquid mercury at a known temperature.

As a preliminary matter to these adjustments, the apparatus may be conditioned for operation by baking the tubes 2 and 4 by means of the heating coils 102 and 104 and flanking the connecting pipes while providing flow of air through the apparatus, the purpose of this being to remove residual mercury which may be contained in the walls of the tubes 2 and 4. It is desirable after long use of the apparatus to repeat this baking to remove any mercury accumulation.

If glass wool is used at 76, it is generally desirable to saturate the glass with mercury vapor since glass does absorb minute amounts thereof. The absorbent 63, and also the absorbent 86, may be regenerated after extended use to increase their capacity for absorption of mercury by baking to drive off what has been absorbed. Various other expedients to stabilize the apparatus against mercury accumulation will be obvious.

The apparatus as described is quite specific to mercury. Substances other than mercury in the sampled air, and which might exhibit absorption of the ultraviolet illumination pass through the apparatus branches equally and give no differential response. The gold absorbent is quite inert for all such substances. Alloys of gold and silver may be used if these are sufficiently high in gold content so as not to be affected by hydrogen sulfide. Silver alone may be used, though its effective life is shortened by formation of sulfide.

Various changes in the apparatus may be made without departing from the invention. While a low pressure mercury vapor source is most desirable because of its high emission in the 2537 A. band, other sources, e.g. a broad band flame source having substantial emission in this band may be used, though generally such sources will give a high background of useless radiation and would require for practical results the use of a monochromator to increase the content of useful radiation.

It is desirable that the air streams be kept moving. If attempts are made to measure stationary samples several disturbing factors may exist. A stagnant sample may give up mercury to the walls of the measuring chamber; or alternatively mercury in or on these walls may be given up to the sample. But one principal reason for avoiding stagnant samples is that the radiation at 2537 A. converts oxygen to ozone which is somewhat more absorptive of this band than oxygen. But even worse, ozone formation leads to oxidation of mercury to mercuric oxide which is non-volatile and would interfere with measurements by forming dust particles. By maintaining flow these disturbing matters are minimized by rapid washing out of the disturbing materials from the measuring chambers and by minimizing the exposures of the samples to mercury-depositing or mercury absorbing actions.

Consistent with maintaining flow and the balanced operation the travel path of the air may be modified to feed the measuring chambers in series rather than in parallel. In this modification a sample of air containing mercury may be passed first through the measuring tube 4, and then in series through the absorbing chamber 62 and the measuring tube 2, from which it may pass to line 88 and the various housings as previously described. The results of this procedure are satisfactory when the air drawn in remains substantially constant in mercury content and in content of other radiation absorbing vapors. But the split stream arrangement first described is considerably better, always comparing against each other samples having the same time origin. In the series arrangement, furthermore, pressure drops involved cause differences in pressures, though slight, in the two measuring chambers.

Another alternative which may be used may involve the use of independent streams of air, originating in the same region of the atmosphere or in the same hole such as 48 but advanced by a pair of pumps operating at the same displacement rate (i.e. identical pumps driven by the same motor), the independent streams flowing through the respective measuring chambers with prior removal of mercury from one of the streams.

It will be clear that various other changes in details of the apparatus may be made without departing from the invention as defined in the following claims.

The absorption chambers and materials described herein have utility aside from the apparatus set forth and are claimed in our copending application Serial Number 189,863, filed April 24, 1962.

What is claimed is:

1. The method of prospecting for mercury-containing minerals comprising
   providing two samples of air ambient to the same region under investigation,
   extracting only mercury from only one of said samples,
   thereafter passing through approximately equal optical paths through said samples ultraviolet radiation absorbable by mercury vapor,
   and detecting the differential absorption of the ultraviolet radiation by said samples.

2. The method of claim 1 in which a single sample of air is subdivided to provide the said samples.

3. The method of claim 1 in which said air samples are taken from a hole in the earth.

4. The method of claim 1 in which said air samples are taken from a covered hole in the earth into which air enters through its cover from the atmosphere.

5. The method of claim 4 in which the air entering the hole is substantially free of mercury.

6. The method of claim 1 in which mercury is extracted from the first mentioned sample by absorption by a mercury-wettable metal.

7. The method of claim 6 in which the metal is a noble metal.

8. The method of claim 1 in which mercury is extracted from the first mentioned sample by absorption by gold.

9. The method of claim 1 in which mercury is extracted from the first mentioned sample by absorption by a fibrous carrier coated with a mercury-wettable metal.

10. The method of claim 1 in which mercury is extracted from the first mentioned sample by absorption by a fibrous carrier coated with a mercury-wettable noble metal.

11. The method of claim 1 in which mercury is extracted from the first mentioned sample by absorption by a gold-coated metal non-wettable by mercury.

12. The method of claim 1 in which mercury is extracted from the first mentioned sample by absorption by gold-coated nickel wool.

13. The method of claim 1 in which the ultraviolet radiation is produced by an ionized mercury source.

14. Apparatus for the detection of small concentrations of mercury vapor in a gas comprising
a source of ultraviolet light absorbable by mercury vapor,
a pair of light transmitting chambers aligned with said source and providing approximately equal length paths for illumination from said source,
a pair of electrically photosensitive elements responsive to ultraviolet light from said source passing through the respective chambers,
a measuring circuit including said elements and substantially symmetrical with respect thereto,
said circuit including means responsive to unbalance thereof and, accordingly, to differences in illumination of said electrically photosensitive elements,
means providing two gas samples from the same source to said chambers,
said providing means including means for extracting mercury from only one of said samples,
means for passing the last mentioned sample through one of said chambers after the extraction of mercury therefrom, and
means for passing the other of said samples through the other of said chambers.

15. The apparatus of claim 14 in which said sample providing means includes means dividing a single sample of gas into the aforementioned samples.

16. The apparatus of claim 14 in which said samples are provided by the same gas passing in series to the last mentioned chamber, then to the extracting means, and then to the first mentioned chamber.

17. The apparatus of claim 14 in which said source of ultraviolet light is a mercury vapor lamp.

18. The apparatus of claim 17 including high frequency means for exciting said mercury vapor lamp.

19. The apparatus of claim 14 in which said means for extracting mercury from one of said subsamples comprises a mercury-wettable metal.

20. The apparatus of claim 14 in which said means for extracting mercury from one of said subsamples comprises a mercury-wettable noble metal.

21. The apparatus of claim 14 in which said means for extracting mercury from one of said subsamples comprises gold.

22. The apparatus of claim 14 in which said means for extracting mercury from one of said subsamples comprises a fibrous carrier coated with a mercury-wettable metal.

23. The apparatus of claim 14 in which said means for extracting mercury from one of said subsamples comprises gold-coated nickel.

24. The apparatus of claim 14 in which said means for extracting mercury from one of said subsamples comprises gold-coated wool of a metal non-wettable by mercury.

25. Apparatus for the detection of small concentrations of mercury vapor in a gas comprising
a source of ultraviolet light absorbable by mercury vapor,
a pair of light transmitting chambers optically aligned with said source and providing approximately equal length paths for illumination from said source,
electrically photosensitive means responsive to ultraviolet light passing through both of said chambers from said source,
measuring means operated by said photosensitive means in accordance with the response of the latter to said ultraviolet light,
means providing two gas samples from the same source to said chambers,
said providing means including means for extracting only mercury from only one of said samples,
means for passing the last mentioned sample through one of said chambers after the extraction of mercury therefrom, and
means for passing the other of said samples through the other of said chambers.

26. The apparatus of claim 25 in which said sample providing means includes means dividing a single sample of gas into the aforementioned samples.

27. The apparatus of claim 25 in which said samples are provided by the same gas passing in series to the last mentioned chamber, then to the extracting means, and then to the first mentioned chamber.

28. The apparatus of claim 25 in which said source of ultraviolet light is a mercury vapor lamp.

29. The apparatus of claim 28 including high frequency means for exciting said mercury vapor lamp.

30. The apparatus of claim 25 in which said means for extracting mercury from one of said subsamples comprises a mercury-wettable metal.

31. The apparatus of claim 25 in which said means for extracting mercury from one of said subsamples comprises a mercury-wettable noble metal.

32. The apparatus of claim 25 in which said means for extracting mercury from one of said subsamples comprises gold.

33. The apparatus of claim 25 in which said means for extracting mercury from one of said subsamples comprises a fibrous carrier coated with a mercury-wettable metal.

34. The apparatus of claim 25 in which said means for extracting mercury from one of said subsamples comprises gold-coated nickel.

35. The apparatus of claim 25 in which said means for extracting mercury from one of said subsamples comprises gold-coated wool of a metal non-wettable by mercury.

36. The method of detecting mercury vapor in minute concentration in a gas comprising
producing a flow of a first relatively large volume of said gas in contact with a solid material which absorbs mercury from the gas at ordinary temperatures;
effecting vaporization of the absorbed mercury into a second volume of a second gas substantially less than said first volume;
and measuring the mercury vapor content of said second volume of gas.

37. The method of claim 36 in which said material is a noble metal.

38. The method of claim 36 in which said material is gold.

39. The method of detecting mercury vapor in minute concentration in a gas comprising
producing a flow of a first relatively large volume of said gas in contact with a solid material which absorbs mercury from the gas at ordinary temperatures;
effecting vaporization of the absorbed mercury into a second volume of a second gas substantially less than said first volume;
providing two samples of said second gas containing the vaporized mercury;
extracting only mercury from only one of said samples;
thereafter passing through approximately equal optical paths through said samples ultraviolet radiation absorbable by mercury vapor;
and detecting the differential absorption of the ultraviolet radiation by said samples.

References Cited by the Examiner

UNITED STATES PATENTS

| | | | |
|---|---|---|---|
| 2,165,214 | 7/39 | Blau et al. | 250—83.6 |
| 2,395,489 | 2/46 | Major | 250—43.5 |
| 2,411,672 | 11/46 | Van Den Akker | 250—218 X |
| 2,459,512 | 1/49 | Fash et al. | 250—83 |
| 2,765,409 | 10/56 | Hutchins et al. | 250—43.5 |

FOREIGN PATENTS

| | | |
|---|---|---|
| 405,937 | 2/34 | Great Britain. |
| 120,365 | 10/57 | Russia. |

OTHER REFERENCES

Maley: "Balanced Ionization Chambers Offer Sensitive Gas Analysis," Nucleonics, March 1960, page 126.

RALPH G. NILSON, *Primary Examiner*.

ARCHIE R. BORCHELT, *Examiner*.